Dec. 19, 1961  F. L. HUTCHENS ETAL  3,014,131
INFRARED RANGE FINDER
Filed Feb. 25, 1960  2 Sheets-Sheet 1

INVENTORS
FREDERICK L. HUTCHENS
JOHN W. INGELS
BY
H. H. Losche
ATTORNEYS

INVENTOR.
FREDERICK L. HUTCHENS
JOHN W. INGELS

United States Patent Office 3,014,131
Patented Dec. 19, 1961

3,014,131
INFRARED RANGE FINDER
Frederick L. Hutchens, El Paso, Tex., and John W. Ingels, Ingalls, Ind., assignors to the United States of America as represented by the Secretary of the Navy
Filed Feb. 25, 1960, Ser. No. 11,108
3 Claims. (Cl. 250—83.3)
(Granted under Title 35, U.S. Code (1952), sec. 266)

The invention described herein may be manufactured and used by or for the Government of the United States of America for governmental purposes without the payment of any royalties thereon or therefor.

The present invention is a continuation-in-part of a patent application entitled "Infrared Range Finder," Serial No. 728,496, filed April 14, 1958, now abandoned.

The present invention relates to range finding devices and more particularly to passive range finding devices that determine range automatically.

Range finding devices are classed broadly as either active or passive. An active system or range finding, of which radar is a good example, broadcasts or transmits information to a target which reflects or returns the signal to a receiver. From the rate and time of travel, the distance to a target can readily be determined.

A passive range finding device does not employ transmitting means in determining range, but only receives information emitting from a target. Passive range finding devices can be classed broadly into either the optical or the infrared type. In the former type of range finding devices, an operator adjusts a measuring wedge which deviates the light from one of two viewing windows to be parallel with the light from the other viewing window. Optical range finding instruments have several inherent disadvantages, one being that a trained operator is constantly required to monitor the instrument.

Infrared ranging devices use the natural thermal infrared radiation emitted by a target to measure its range. Both the characteristics and the amount of infrared radiation reaching the range finder from a target are of prime importance. The characteristics of the radiation received are determined almost entirely by the emissive characteristics of the target. The amount of radiation received depends on the temperature, area, and emissivity of the target, on the inverse square of the distance, and on the attenuation by the atmosphere.

The amount of energy (E) radiated by a body is proportional to the fourth power of the temperature (T) (absolute scale) in the ideal case. The perfect radiator is one which does not transmit or reflect any incident energy, but absorbs, and thus eventually emits, all radiant energy falling upon it. For this black body case, (1)  $$E = kT^4$$

where $k$ is a constant. Since ordinary objects do reflect, the modified expression is, (2)  $$E = ekT^4$$

where $e$ is the emissivity and varies with the material. Each expression is for the radiant flux per unit area of the source.

While the use of infrared for detection purposes is gaining in prominence, only a few infrared range finders have been developed in the past. One such range finder was recently developed for shipboard use by the U.S. Navy in which the infrared radiation from the target enters the range finder through three windows. Behind the windows, large mirrors collect the radiation and focus it on a series of infrared detecting elements, which rotate at a uniform speed. The right end mirror assembly is fixed to look directly at the target. The left mirror assembly can be turned, or "toed in," slightly until its image of the target is brought to a predetermined position relative to the image from the right mirror. The amount of "toeing in," or angle, and the range finder base length—distance between mirror assemblies—are used to determine range to the target. The correct position of the rotatable mirror is determined by comparing the signals resulting from the two beams of infrared radiation falling on the detectors. This is done electrically by a comparison of phases. Behind the third window, another mirror, with its own rotating detector assembly, provides tracking information to keep the range finder on target.

Another infrared range finder recently developed for the U.S. Navy is described in U.S. Patent 2,830,487 entitled, "Automatic Range Finding Device." In this range finder, two electro-optical receivers are spaced apart a fixed distance and are rotated at a uniform rate of rotation. The fields of view of these electro-optical receivers will sweep a given target at slightly different times since they are spaced apart a fixed distance. A measure of this time interval, along with the angular rate of rotation and the distance between receivers, can be utilized to compute the distance to a target.

The present invention is functionally similar to the above-identified U.S. patent in that range is measured as a function of time and frequency. However, in the present invention, the infrared detecting cells are mounted stationary within a rotatable cage. This cage is provided with a plurality of slits in its periphery and the infrared radiation emitted from a target is passed through these rotating slits and focussed onto the detectors. As the slits are rotating at a constant speed, range can be determined by the triangulation method from the time difference between received pulses.

Numerous advantages are obtained by the structural arrangement of the present invention as background signals are eliminated since the signals coming through several slits at one time are uniformly spread over the detector cell. Also the dwell time can be greatly increased, a greater field of view can be provided, and the repetition rate can be increased.

It is therefore a general object of the present invention to provide an improved infrared ranging device.

Other objects and many of the attendant advantages of this invention will be readily appreciated as the same becomes better understood by reference to the following detailed description when considered in connection with the accompanying drawing wherein.

Figures 1, 2, 3:
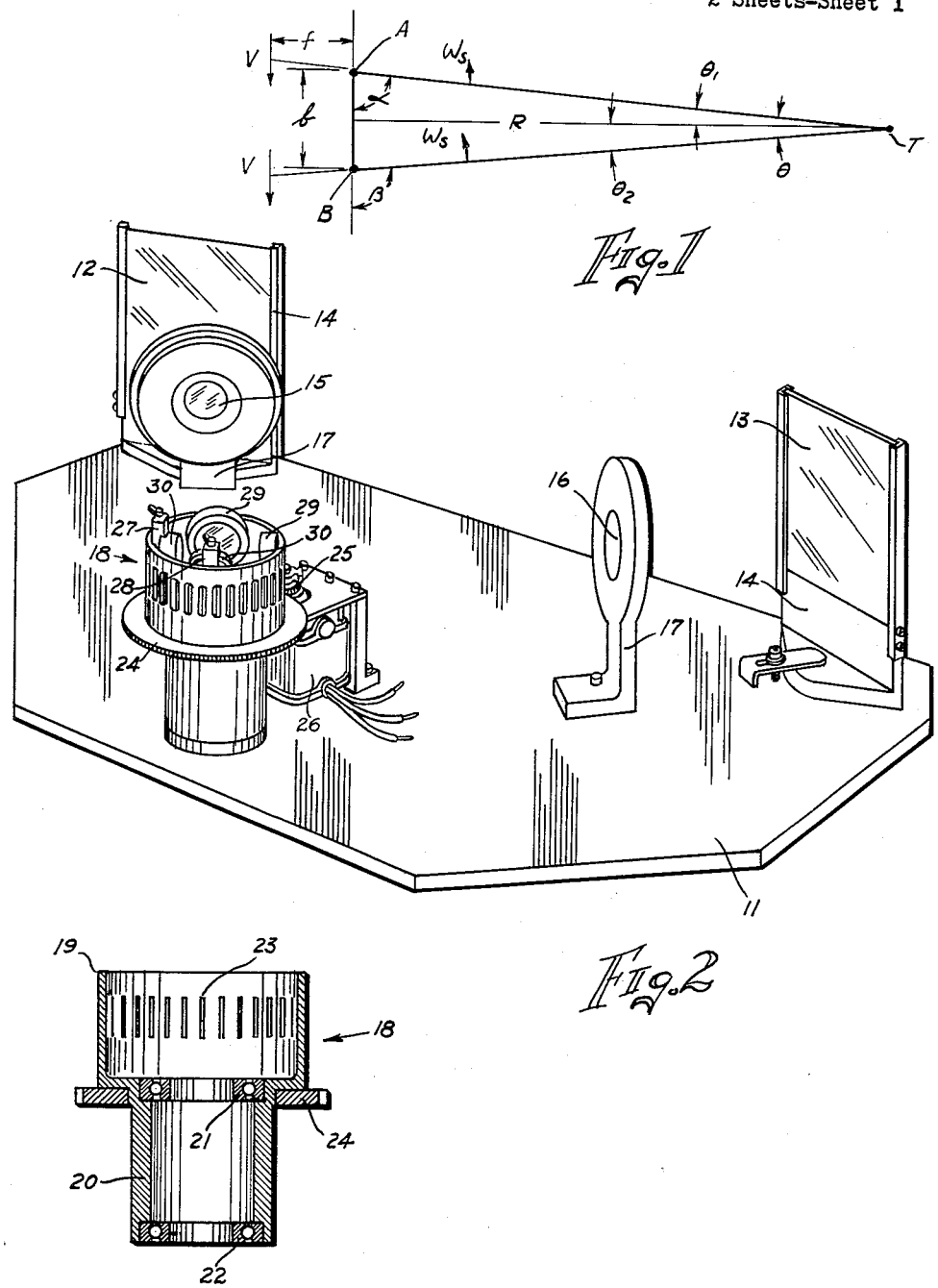
FIGURE 1 is a diagrammatic view showing the mathematical relationship of a target and receivers.
FIGURE 2 is a perspective view of a preferred embodiment of the present invention.
FIGURE 3 is a sectional view of a rotatable cage.

Referring now to the drawing, and particularly to FIGURE 2 thereof, there is shown a base plate 11 on which a pair of mirrors 12 and 13 are mounted. These mirrors are mounted in a plane which is perpendicular to the base plate 12, and retained in position by means of brackets 14. A pair of objective lenses 15 and 16 are mounted in brackets 17 and are positioned between the mirrors 12 and 13, respectively, and a rotatable cage 18.

The rotatable cage 18, which is shown in FIGURES 2 and 3 of the drawing, is comprised of an upper portion 19 and a lower portion 20. The lower portion 20 is provided with a pair of bearings 21 and 22 so that the cage 18 can be rotated relative to the base plate 11. The upper portion 19 of the cage 18 is provided with a plurality of slots 23 that extend around the periphery thereof. By way of example, and not of limitation, the slots may be five-eighths of an inch long, one-thirty second of an inch wide, and positioned every twelve degrees. A gear 24 is press fitted, or otherwise attached, to the rotatable cage 18, and, as shown in FIGURE 2 of the drawing, gear 24 meshes with pinion gear 25 that is attached to the shaft of a constant speed motor 26.

Referring now to FIGURE 2 of the drawing, it can be seen that a pair of photo-conductive detectors 27 and 28 are mounted stationary inside the cage 28 and that a pair of focussing lenses 29 and 30 are provided for each detector to focus the radiant energy that is emitted from a target. By way of example, the photo-conductive detectors might be of the lead sulfide type (PbS) which consists of the deposition of PbS between two electrodes. The energy, which is focussed on the photo-conductive detectors 17 by the lenses, causes a change in resistance to take place and for a given potential, change in resistance causes a change of current flow.

From FIGURE 1 of the drawing, wherein $b$ is the distance between points A and B, the optical centers of an objective lens system, and R is the range to a target, T, it can be seen that:

$$(3) \quad \tan \theta_1 = \frac{b/2}{R}$$

and also $$(4) \quad \tan \theta_2 = \frac{b/2}{R}$$

therefore $$(5) \quad \theta_1 = \theta_2 = \frac{\theta}{2}$$

and $$(6) \quad \tan \frac{\theta}{2} = \frac{b/2}{R}$$

and consequently when $R \gg b$ $$(7) \quad \frac{b}{R} = \theta$$

Also from FIGURE 1 of the drawing, it can be seen that:

$$(8) \quad \frac{V}{f} = \omega_s = \frac{\alpha}{t_A} = \frac{\beta}{t_B}$$

where V is the velocity of each slit across the images of the field of view; $f$ is the focal length of the objective lens system; and $\omega_s$ is angular rate of object space.

If we designate the time to sweep out angle $\alpha$, "$t_A$," the time to sweep out angle $\beta$, $t_B$ and let $t_R$ be the time interval inversely proportional to range, then:

$$(9) \quad t_R = t_B - t_A$$

By combining Equations 8 and 9, it can be seen that:

$$(10) \quad t_R = f \frac{(\beta - \alpha)}{V}$$

and since $(\beta - \alpha) = \theta$, then:

$$(11) \quad t_R = \frac{f\theta}{V}$$

By combining Equations 7 and 11 and eliminating $\theta$, we have $$(12) \quad R = \frac{fb}{V t_R}$$

In Equation 12, since $f$, $b$ and V are all predetermined constant values, it can be seen that range, R, is a function of a single variable $t_R$, and that it is only necessary to measure $t_R$ to determine range.

Figure 4:
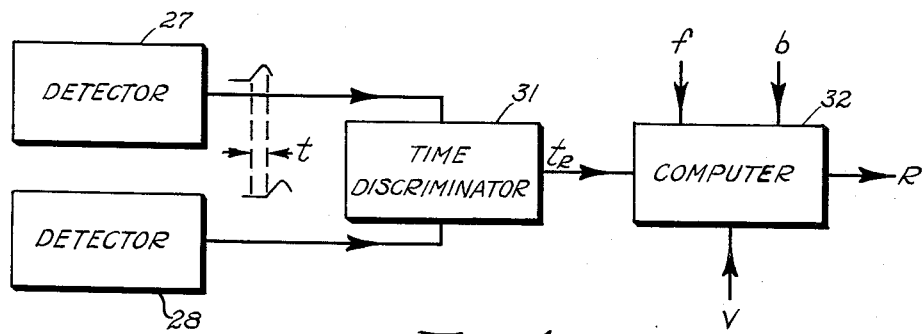
FIGURE 4 is a diagrammatic view of a system for computing range.

In actual practice, as $t_R$ is the time difference between pulses, it may be desirable to feed the separate pulses into a pulse separation measuring circuit, and then into a computer. Such an arrangement is shown in FIG. 4 of the drawing which shows the pulses fed into a time discriminator 31 to give the value $t_R$, which is inversely proportional to range. The value for $t_R$ and the constant values $f$, $b$, and V can then be fed into a computer 32 which will compute the range to a target, T. The time discriminator 31 might be one of many well-known in the electronic art. As Equation 12 shows that only multiplication and division are required, the computer might be one of many well-known types available, either electrical or mechanical.

In operation, the cage 18 is rotated at a constant speed by the motor 26 through gears 24 and 25. Radiant energy, which might be either in the visible or the infrared frequency range, is emitted by the target and reflected by mirrors 12 and 13 onto the rotating cage 18. Mirrors 12 and 13 are adjustable and can be aligned so that the radiant energy is reflected through the objective lenses 15 and 16, which focus the energy onto the cage 18. In calibration, a point source of light is placed at a specified distance from the rotating cage and the output pulses from the detectors are adjusted, by adjusting the mirrors, until the distance between the pulses corresponds to the distance of the point of light to the cage. The slot 23 permit the radiant energy to pass, intermittently, to the inside of the cage where lenses 29 and 30 focus it onto the stationary photo-conductive detectors 27. The rotating cage 18 acts as a chopper and, as shown by Equation 12, range can be determined by the triangulation method from the time difference between received pulses.

It can thus be seen that the device herein described provides a convenient and accurate method of determining range to a target that is emitting infrared energy.

Obviously many modifications and variations of the present invention are possible in light of the above teachings. It is therefore to be understood that the invention may be practiced otherwise than as specifically described.

What is claimed is:

1. In a ranging device a base plate, first and second radiant energy detectors stationarily mounted to said base plate, first and second mirrors attached to said base plate, one each for reflecting radiant energy emitted from a distant object to each detector, first and second lens systems for focussing the reflected radiant energy onto said detectors, a circular rotatable cage having a plurality of slots therein and encircling said first and second radiant energy detectors, a gear attached to said cage, a constant speed motor attached to said base plate and having a shaft protruding from one end thereof, and a gear attached to said shaft and in driving relation with the gear attached to said cage.

2. In a ranging device, a base plate, first and second radiant energy detectors stationarily mounted to said base plate, first and second reflecting means attached to said base plate for reflecting radiant energy emitted from a distant object to said detectors, and a circular cage rotatably mounted on said base and having a plurality of slots therein, said circular cage encircling said first and second radiant energy detectors.

3. In a device for determining the range of a distant object, a base plate, first and second radiant energy detectors stationarily mounted to said base plate, first and second mirrors attached to said base plate, one each for reflecting radiant energy emitted from a distant object to each detector, first and second lens systems for focussing the reflected radiant energy onto said detectors, a circular cage rotatably mounted to said base and having a plurality of slots therein, said circular cage encircling said first and second radiant energy detectors whereby said radiant energy reflected from each mirror is interrupted thereby producing periodic pulses, and means for indicating the time interval between separate pulses generated by different detectors.

References Cited in the file of this patent

UNITED STATES PATENTS

| | | |
|---|---|---|
| 2,431,625 | Tolson | Nov. 25, 1947 |
| 2,715,807 | Irmscher | Aug. 23, 1955 |
| 2,830,487 | Griffith | Apr. 15, 1958 |
| 2,943,201 | Hicks et al. | June 28, 1960 |